Sept. 15, 1931.    J. S. KERN ET AL    1,823,202
CLAMP FOR WINDSHIELDS
Filed April 25, 1929
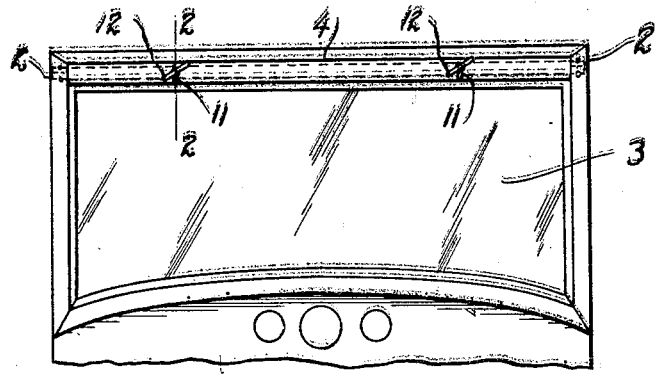
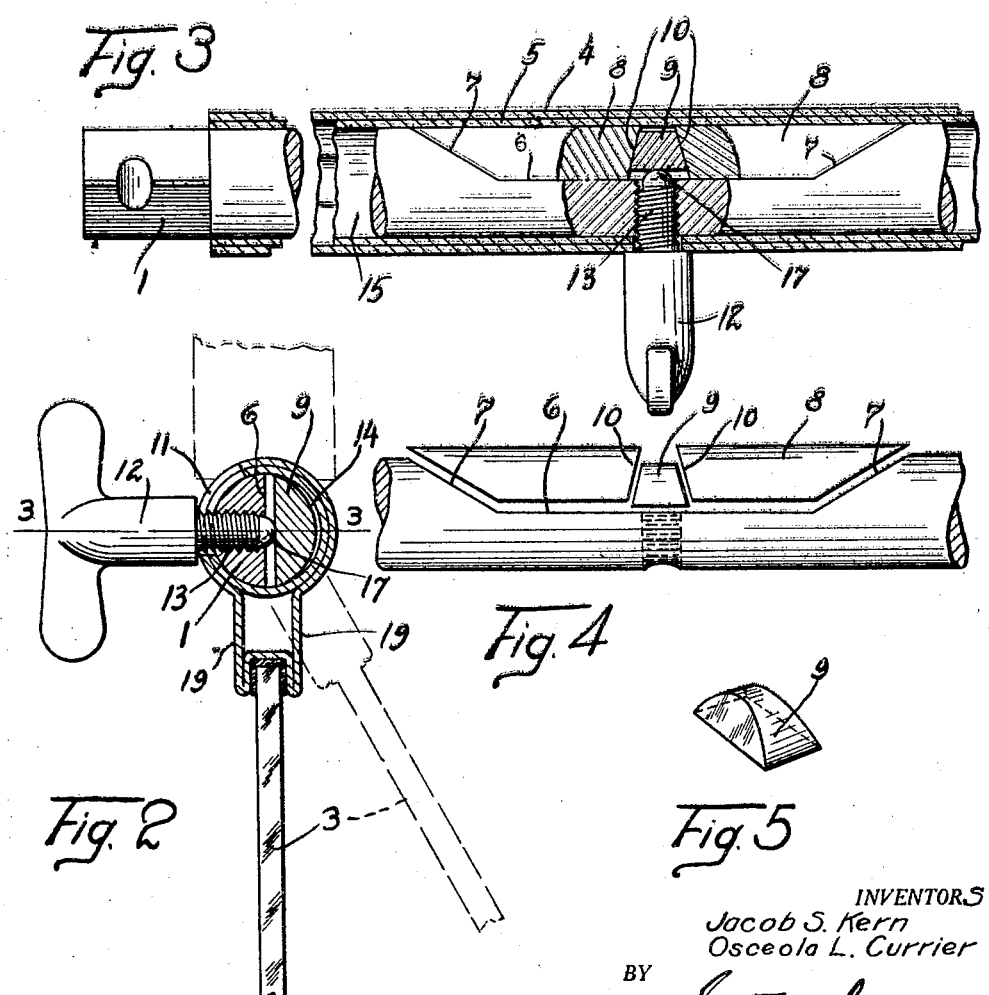
INVENTORS
Jacob S. Kern
Osceola L. Currier
BY
ATTORNEY.

Patented Sept. 15, 1931

1,823,202

UNITED STATES PATENT OFFICE

JACOB S. KERN, OF FLEETWOOD, AND OSCEOLA L. CURRIER, OF MOUNT PENN, PENN-SYLVANIA, ASSIGNORS TO FLEETWOOD BODY CORPORATION, OF FLEETWOOD, PENN-SYLVANIA, A CORPORATION OF PENNSYLVANIA

CLAMP FOR WINDSHIELDS

Application filed April 25, 1929. Serial No. 357,909.

This invention relates to a clamp for a windshield.

In windshields of the type having a stationary support shaft and a tubular member arranged to carry the windshield and to pivot about the support shaft when the windshield is moved into open or closed position, it is desirable to have means for holding the windshield in either the open or closed position that are simple in construction and easy to operate. Hence, this invention contemplates a clamp for this type of windshield which consists of a stationary support shaft having a flared recess, one or more tubular members rotatably mounted upon the support shaft and arranged to carry the windshield, a pair of wedge blocks for the flared recess, and a central spreader wedge block arranged to slidably engage the aforesaid wedge blocks to force the said wedge blocks upwardly along the sides of the flared opening of the support shaft into frictional engagement with the tubular member.

In the drawings:

Fig. 1 is an elevation of the windshield and clamp assembly viewed from the driver's seat.

Fig. 2 is a section along the line 2—2 of Fig. 1.

Fig. 3 is a section along the line 3—3 of Fig. 2.

Fig. 4 is a detail of the support shaft with its flared recess and of the wedge blocks and spreader wedge block.

Fig. 5 is a detail of the spreader wedge block.

Referring more particularly to the drawings, it will be seen that the windshield clamp consists of the support shaft 1 which is fixed in the windshield pillar as at 2. The windshield glass 3 is carried by the external channel tube 4. The channel tube 4 encloses an inside tube 5 which is rotatably mounted upon the support shaft 1.

The support shaft has a flared recess 6 with the flared sides 7. Slidably mounted within the recess 6 are the wedge blocks 8 which are in spaced relation to provide for a spreader wedge block 9 arranged to slidably engage in wedging relation the ends 10 of the wedge blocks. The outer channel tube and inner tube are slotted as at 11 for the hand screw 12 which has a threaded engagement with the support shaft 1 as at 13.

It is evident that after the windshield has been rotated about the support shaft 1 to any desirable position such as that shown by the dotted lines of Fig. 2, that it may be clamped in this position by merely turning the hand screw 12. The hand screw 12 engages the spreader wedge block 9 as at 17 and the spreader wedge block effects a wedging engagement with the wedge blocks 8. This wedging action of the block 9 causes the blocks 8 to move laterally and upwardly along the flared faces 7 of the recess in the support shaft 1 and into frictional, clamping engagement with the inner tube 5.

By referring to Fig. 2, it will be noted that the channel tube 4 has a channel portion for holding the windshield formed by the parallel sides 19. It is evident that if the wedging action of the spreader wedge block 9 and the wedge blocks 8 were effected against this outer channel tube, that the faces 19 of the channel portion would be distorted. To avoid this distortion of the channel tube, the inside tube 5 is mounted within the tubular member 4 and in fixed relation therewith so that the expansive force of the friction pins 8 is taken up by the inside tube instead of by the channel tube. In other words, the inside tube and channel tube function as a unit.

What we claim is:

A windshield clamp having in combination a support shaft with a flared recess, a tubular member rotatably mounted on the said shaft and arranged to carry a windshield, one or more wedge blocks for the said recess, a spreader wedge block for slidably engaging the said wedge blocks to force them outwardly along the flared sides of said recess to effect a frictional engagement between the said tubular member and the said wedge blocks.

In testimony whereof we affix our signatures.

JACOB S. KERN.
OSCEOLA L. CURRIER.